United States Patent
Kumar

(10) Patent No.: US 8,755,500 B2
(45) Date of Patent: *Jun. 17, 2014

(54) BIOMETRIC IDENTIFICATION IN COMMUNICATION

(71) Applicant: AT&T Intellectual Property I, L.P., Atlanta, GA (US)

(72) Inventor: Saurabh Kumar, Jersey City, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/678,083

(22) Filed: Nov. 15, 2012

(65) Prior Publication Data

US 2013/0070919 A1  Mar. 21, 2013

Related U.S. Application Data

(63) Continuation of application No. 12/273,048, filed on Nov. 18, 2008, now Pat. No. 8,358,759.

(51) Int. Cl.
*H04M 17/00* (2006.01)

(52) U.S. Cl.
USPC ...... 379/145; 340/5.82; 340/5.84; 379/88.02; 379/201.11

(58) Field of Classification Search
CPC ............... H04M 3/22; H04M 3/2227–3/2236; H04M 3/2281; H04M 2203/60; H04M 2203/6027; H04M 2203/6045; H04M 2203/6054; G10L 15/00–15/20; G10L 17/00–17/26; G10L 25/78–25/93
USPC ............. 340/5.8, 5.81, 5.82, 5.83, 5.84, 5.85; 348/14.07–14.16; 370/259–271, 370/351–356; 379/67.1–88.28, 201.01, 379/142.01–142.18, 145, 201.11, 207.13, 379/210.03; 455/412.1–420, 426.1, 426.2, 455/550.1–560, 575.1–575.9, 90.1–90.3; 704/270–278; 709/201–207, 217–248
See application file for complete search history.

(56) References Cited

U.S. PATENT DOCUMENTS

| | | |
|---|---|---|
| 5,897,616 A | 4/1999 | Kanevsky et al. |
| 6,101,242 A | 8/2000 | McAllister et al. |
| 6,404,858 B1 | 6/2002 | Farris et al. |
| 6,658,455 B1 | 12/2003 | Weinman, Jr. |
| 7,003,466 B2 | 2/2006 | Brown et al. |
| 7,006,605 B1 | 2/2006 | Morganstein et al. |
| 7,010,099 B2 | 3/2006 | Koch et al. |
| 7,035,386 B1 | 4/2006 | Susen et al. |
| 7,155,211 B2 | 12/2006 | Mun et al. |

(Continued)

*Primary Examiner* — Hemant Patel
(74) *Attorney, Agent, or Firm* — Cantor Colburn LLP

(57) ABSTRACT

A method is provided for identifying a calling party to a called party utilizing biometric information. Biometric information of first calling party is received. If stored, a calling party profile is retrieved based on first calling party biometric information. A call is placed to a called party. The first calling party profile is provided to called party. A biometric information change from first calling party biometric information to a second calling party biometric information is automatically detected, and it is determined whether the second party biometric information is stored. If stored, a second calling party profile of second calling party is retrieved and is provided to called party. Responsive to determining that the biometric information for second calling party is not stored, the called party is notified that the second calling party is communicating and the second calling party profile is automatically created based on second calling party biometric information.

20 Claims, 5 Drawing Sheets

(56) References Cited

U.S. PATENT DOCUMENTS

| | | | |
|---|---|---|---|
| 7,783,022 B1* | 8/2010 | Jay et al. | 379/202.01 |
| 8,358,759 B2* | 1/2013 | Kumar | 379/145 |
| 2003/0108161 A1 | 6/2003 | Brown et al. | |
| 2004/0066916 A1* | 4/2004 | Brown et al. | 379/88.01 |
| 2006/0188076 A1 | 8/2006 | Isenberg | |
| 2006/0215828 A1 | 9/2006 | Goguen et al. | |

* cited by examiner

BIOMETRIC IDENTIFICATION IN COMMUNICATION

CROSS-REFERENCE TO RELATED APPLICATIONS AND PRIORITY CLAIM

This application is a continuation of U.S. Non-Provisional application Ser. No. 12/273,048, entitled "BIOMETRIC IDENTIFICATION IN COMMUNICATION", filed Nov. 18, 2008, which is incorporated herein by reference in its entirety.

BACKGROUND

Exemplary embodiments relate generally to communications, and more particularly, to communications utilizing caller identification along with biometric identification.

Caller identification (also known as caller ID, CID, or calling number identification) is a service, available, e.g., on POTS (plain old telephone service) line, that transmits a caller's number to the called party's telephone equipment during the ringing signal, or when the call is being set up. Where available, caller ID can also provide a name associated with the calling telephone number. The information made available to the called party may be made visible on a telephone's own display or on a separate attached device.

Caller ID is often helpful for tracing prank calls and other unwanted intrusions. Many times the called party views the caller ID before answering the telephone, and when the number or name is not recognized, the called party does not answer the phone. However, in some cases, the person calling may actually be someone that the called party would recognize but the person calling is at a different telephone from his/her home telephone.

BRIEF SUMMARY

Exemplary embodiments include a method for identifying a calling party to a called party utilizing biometric information. An input of biometric information of a first calling party is received for communications. In response to determining that the biometric information of the first calling party is stored, a calling party profile of the first calling party is retrieved based on the first calling party biometric information. A call is placed to a called party. The first calling party profile is provided to the called party, and the first calling party profile identifies the first calling party. A biometric information change from the first calling party biometric information to a second calling party biometric information is automatically detected during the call currently existing with the called party. In response to detecting the biometric information change from the first calling party to the second calling party, it is determined whether the biometric information of the second calling party is stored. A second calling party profile of the second calling party is retrieved based on the second calling party biometric information, in response to the second calling party biometric information being stored. The second calling party profile is provided to the called party during the existing call with the called party, where the second calling party profile identifies the second calling party. In response to determining that the biometric information for the second calling party is not stored, the called party is notified that the second calling party is communicating during the existing call. In response to determining that the biometric information for the second calling party is not stored, the second calling party profile is automatically created during the existing call based on the second calling party biometric information.

Other systems, methods, apparatus, and/or computer program products according to embodiments will be or become apparent to one with skill in the art upon review of the following drawings and detailed description. It is intended that all such additional systems, methods, apparatus, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

Figure 1:
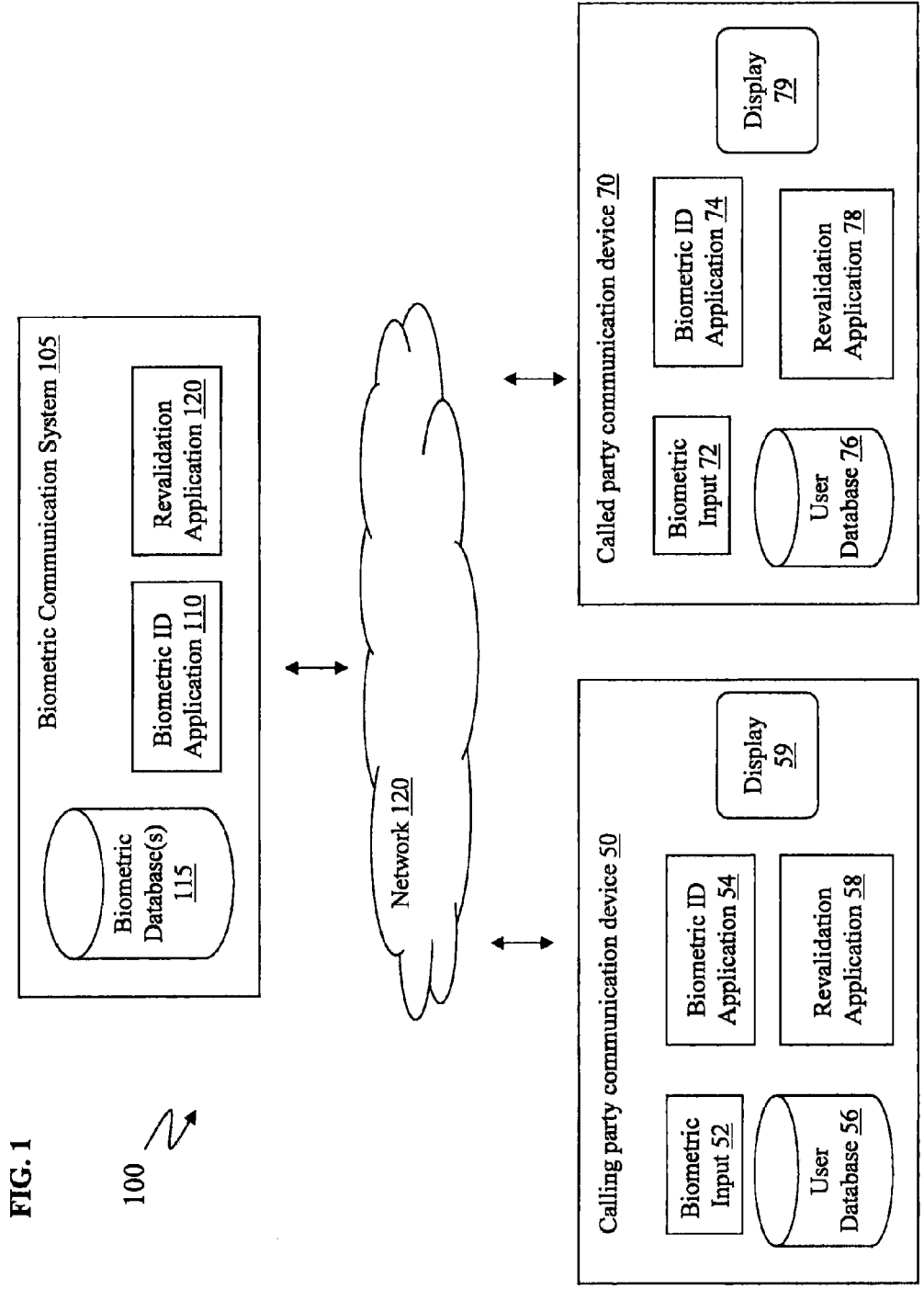
FIG. 1 illustrates an example of an architecture in which biometric identification caller identification services may be implemented in accordance with exemplary embodiments.

The detailed description explains the exemplary embodiments, together with features, by way of example with reference to the drawings.

DETAILED DESCRIPTION OF EXEMPLARY EMBODIMENTS

Exemplary embodiments provide biometric identification caller ID services to identify callers by their biometric identification (such as voice, facial recognition, fingerprint, iris (eye), etc.) along with caller ID, which can enhance security and reduce frauds.

First, for a telephone call using traditional techniques, a caller dials the telephone number for a called party, and a switching element rings the called party. The switching element receives the telephone number from which the call was placed and can obtain traditional caller ID information, such as the name and telephone number of the residence in which the call was placed. The switching element provides the telephone number and name of the residence to the called party, which can be displayed on a display of the caller ID device.

However, in accordance with exemplary embodiments, a telecommunication provider may (first) prompt a calling party for biometric identification (such as a voice signature, image, fingerprint, retinal scan, or any other means) before the calling party can use the telecommunication network, system, or device. For example, the calling party may have to turn on the telephone and speak, and then the telecommunication provider authenticates the voice data before allowing access to the telecommunication network. The biometric information, e.g., may be stored in a centralized location. In one exemplary embodiment, everyone attempting to place a call may need to clear this biometric security to, e.g., get the dial tone for initiating a call. For example, the calling party may have to be authenticated to use the communication device, to access the telecommunication network, and/or to access the communication services of the service provider.

This recognized biometric information input by the calling party can be associated with the name and picture of the calling party, and when the call is made, the name, picture, and/or telephone number are displayed to the called party. If during the call the voice changes (e.g., the person speaking changes or the person speaking pauses) from a first calling party to a second calling party, then a voice recognition system will be triggered. The called party would be notified of the change in speakers from the first calling party to the second calling party now speaking, and the second calling party would be identified, e.g., with a name, picture, telephone number, etc., to the called party.

Exemplary embodiments can enhance security and reduce fraud. If the called party looks at this biometric ID information being displayed, even from a strange number, the called party can recognize who is trying to reach him. Exemplary embodiments can also identify all the people with biometric ID information on a telecommunication network, trace a person who uses the telecommunication network, and/or stop a person from using the telecommunication network if required for security purposes. Also, the telecommunication provider (such as AT&T®) may initially collect user biometric ID information in the telecommunication network, by e.g., collecting voice data similar to a voice greeting recording database.

In the description, for illustrative purposes, a "call" and "caller ID" are described with reference to a telephone call identification information associated with a caller's telephone. However, it should be appreciated that a "call" is not limited to a telephone call but may be any communication, e.g., a communication across a packet-switched VoIP (voice over Internet protocol) network, and the "caller ID" may identify the communication device associated with a particular user. Further details regarding communications in a VoIP network are described herein.

Now turning to FIG. 1, FIG. 1 illustrates an example of an architecture 100 in which biometric identification caller ID services may be implemented in accordance with exemplary embodiments. It is understood that elements may be added to, subtracted from, or substituted in the architecture 100.

The architecture 100 may include a biometric communication system 105. Although not shown for the sake of clarity, the biometric communication system 105 may include a plurality of switches, routers, servers, storages, etc. for operating as discussed herein. The biometric communication system 105 may include one or more biometric identification (ID) applications 110. The biometric ID application 110 is configured to receive (obtain) biometric information from a calling party utilizing a calling party communication device 50 via a network 120. The calling party may input various types of biometric information via a biometric input 52 of the calling party communication device 50. The biometric input 52 may represent one or more devices configured to capture biometric information including facial recognition data, voice data, retinal scan data, and fingerprint data.

Further regarding the network 120, the network 120 may include circuit-switched and/or packet-switched technologies and devices, such as routers, switches, hubs, gateways, etc., for facilitating communications. The network 120 may include wireline and/or wireless components utilizing, e.g., IEEE 802.11 standards for providing over-the-air transmissions of communications. The network 120 can include IP-based networks for communication between a customer service center and clients/users. The network 120 can manage multiple accounts as established by particular users. These accounts may then be used to provide access to services as described herein.

Also, the network 120 may include wireline and/or wireless components utilizing standards for, e.g., multimedia messaging services (MMS). The network 120 may include a multimedia messaging center (MMC), which implements the network side of multimedia messaging service (MMS) and makes it possible for an operator to offer multimedia messaging to mobile communication device users. The MMC is a highly flexible system, which can be adapted to the needs of the operator and the particular end users involved. The MMC manages different sources to/from mobile terminals, supporting a wide range of standard interfaces.

According to exemplary embodiments, the network 120 facilitates transmission of media (e.g., images, video, data, multimedia messaging, etc.) from content services provider systems to customers/users via devices. In exemplary embodiments, the network 120 can include a managed IP and/or wireless network administered by a service provider, which can control bandwidth and quality of service for the communications discussed herein. The network 120 may be implemented in a wireless fashion, e.g., using wireless protocols and technologies, such as WiFi, WiMax, BLUETOOTH, etc. The network 120 can also be a packet-switched network, such as a local area network, a wide area network, a metropolitan area network, an Internet network, or other similar types of networks. The network 220 may be a cellular communications network, a fixed wireless network, a wireless local area network (LAN), a wireless wide area network (WAN), a personal area network (PAN), a virtual private network (VPN), an intranet or any other suitable network, and the network 120 may include equipment for receiving and transmitting signals, such as a cell tower, a mobile switching center, a base station, and a wireless access point.

The biometric ID application 110 can utilize the biometric information input by the calling party to validate or to authenticate the biometric information of the calling party. The biometric ID application 110 may use the biometric information to query biometric databases 115 for a match. For example, the biometric ID application 110 may parse the biometric databases 115 to identify a corresponding user profile(s) having biometric information that matches the biometric information input by the calling party. The biometric databases 115 include various biometric information corresponding to particular user profiles. In the biometric databases 115, biometric information for a user can be utilized to locate the corresponding user profile, and/or a user profile can be utilized to locate the corresponding biometric information.

Once a match to the biometric information (such as voice data, finger print data, facial recognition data, retinal scan data) of the calling party is determined to be in the biometric databases 115 by the biometric ID application 110, the biometric ID application 110 provides the calling party user profile to a called party communication device 70 via the network 120.

The called party can view the user profile (in whole or part) corresponding to the calling party on a display 79 of the called party communication device 70. The user profile of the called party may display the actual name of the calling party, although the calling party may be placing a telephone call from the calling party communication device 50 (e.g., telephone) of another person. The user profile can also display an image (e.g., picture or any other identifying information) of the calling party on the display 79.

Further, during a (existing) call, more than one user may speak on the calling party communication device 50. For the purposes of explanation, there may be a first calling party (which is one user who speaks on the calling party communication device 50), a second calling party (which is a different user), a third calling party (which is yet another user), and so forth. Exemplary embodiments can provide update information to the called party of the called party communication device 70 during an existing call. For example, a first calling party may input biometric information via the biometric input 52. The biometric input 52 may perform a retinal scan of the first calling party, take a fingerprint scan, capture an image of the first calling party's face, and/or record a voice signature (data) of the first calling party. The biometric information obtained by the biometric input 52 is transmitted (pushed) to the biometric application 110. Also, the biometric information may be pulled from the calling party communication device 50. The biometric ID application 110 receives the biometric information and uses the biometric information to search the biometric database 115 to obtain a matching user profile corresponding to the first calling party. As discussed herein, the various data of the first calling party user profile is provided to the called party communication device 70, such that the data of the first calling party user profile is displayed on the display 79 for the called party.

The first calling party on the calling party communication device 50 may be talking with the called party on the called party communication device 70, and another person may speak on the calling party communication device 50, and this person is designated for the purpose of explanation as the second calling party. The second calling party speaking on the calling party communication device 50 can trigger a revalidation application 120. For example, the revalidation application 120 can continuously monitor the (biometric information) voice of the first calling party speaking on the calling party communication device 50, and the revalidation application 120 can recognize a change in the voice data from the first calling party to the voice data of the second calling party. The revalidation application 120 is not limited to a change in voice data. Any change in biometric information during the call can trigger the revalidation application 120. As an example, the second calling party may place his finger on the biometric input 52, and the biometric input 52 can capture the fingerprint data of the second calling party. During the call with the called party, the revalidation application 120 would be triggered by a biometric information change in fingerprint data of the first calling party to the fingerprint data of the second calling party. For example, fingerprint data may be detected by the revalidation application 120 because the revalidation application 120 is continuously comparing the current fingerprint data of the calling party with the matching user profile, and if the fingerprint data of the calling party no longer matches the matching user profile, then the revalidation application 120 is triggered that there has been a change in biometric data. Also, the biometric input 52 can take an image of the second calling party for facial recognition, and any change in facial recognition data from the first calling party to the second calling party during the call would trigger the revalidation application 120. Additionally, the revalidation application 120 may be set to periodically (e.g., at predetermined intervals, such as 5, 10, 15, 20 minute intervals) revalidate the biometric information of the particular person speaking on the calling party communication device 50, which allows the revalidation application 120 to check that the same person is speaking. Also, the revalidation application 120 in conjunction with the biometric input 52 may be set to require the current user (either the first or second calling party) of the calling party communication device 50 to periodically input biometric information (such as fingerprint data) during the call, and this allows the revalidation application 120 to check the identity of the current user.

In response to the revalidation application 120 being triggered (being periodically set or detecting a change in biometric information) by the second calling party speaking, the revalidation application 120 communicates with the biometric ID application 110 to determine and obtain the user profile for the second calling party. The revalidation application 120 causes the biometric ID application 110 to provide the second calling party user profile to the called party communication device 70 for display on the display 79.

Further, if a third calling party (who is different from the first and second calling parties) begins speaking on the calling party communication device 50 during the existing call, the revalidation application 120 will be triggered as discussed herein because of the change in biometric information. The revalidation application 120 causes the biometric ID application 110 to provide the third calling party user profile to the called party communication device 70 for display on the display 79

Now, turning to the calling party communication device 50 and the called party communication device 70 in more detail, both devices 50, 70 may be similar and may include a biometric input, such as the biometric input 52 of the calling party communication device and a biometric input 72 of the called party communication device, having features as discussed herein. The devices 50, 70 may include a biometric ID application 54, 74 which is configured to receive biometric information from the biometric input 52, 72. The biometric ID application 54, 74 can function and operate as discussed above for the biometric ID application 110. Also, both devices 50, 70 may include a (respective local or remote) user database 56, 76, a revalidation application 58, 78, and displays 59, 79. The revalidation application 58, 78 can function and operate as discussed above for the revalidation application 120. In accordance with exemplary embodiments, the following example will refer to and describe particular elements of the calling party communication device 50 but illustrations in the following example describe features applicable to both devices 50, 70, as well as to the biometric ID application 110, the biometric database 115, and/or the revalidation application 120 of the biometric communication system 105.

The calling party may desire to utilize the calling party communication device 50. So that biometric information can be obtained from the calling party, the calling party may place his finger on the biometric input 52, may speak into the biometric input 52, may look into the biometric input 52 for a retinal scan, and/or may look into the biometric input 52 so that an image may be captured for facial recognition. The biometric information of the calling party can be retrieved by the biometric ID application 54. The user database 56 can contain individual user profiles having biometric information for all the users of the calling party communication device 50. For example, a user profile in the user database 56 may include a picture of a respective user, name, etc., and the user profile corresponds to the respective biometric information for that user. The biometric ID application 54 can search the user database 56 utilizing the biometric information input via the biometric input 52. If there is no match in the user database 56 to the input biometric information, the biometric ID application 54 may be configured to prevent access to the calling party communication device 50. Also, in exemplary embodiments, if there is no match, the biometric ID application 54 may be configured to provide a message to the called party communication device 70. The message may inform the called party that the calling party is not an identified user of the calling party communication device 50, or that the calling party is not an authorized user of the calling party communication device 50. Additionally, if the calling party failed to input biometric information via the biometric input 52, the message could indicate that the calling party did not supply biometric information. Also, the message may indicate, e.g., 'the caller is not a resident at the calling telephone number'. The message being displayed on the display 79 of the called party communication device 70 allows the called party to recognize that even though the telephone number of the calling party is familiar, the identity of the particular caller may not necessarily correspond to the calling telephone phone number.

If there is a match in the user database 56 to the input biometric information, the biometric ID application 54 is configured to retrieve the user profile of the calling party who input biometric information, and the biometric ID application 54 can provide the user profile (in whole or part) to the called party communication device 70 for display on the display 79. For example, there may be multiple people who normally access the calling party communication device 50. The user in this instance may be a child. The child can input his biometric information via the biometric input 52, and the biometric ID application 54 discovers a match in the user database 56. In exemplary embodiments, finding the matching user profile in the user database 56 allows the child to utilize the device 50 to communicate. In other exemplary embodiments, a match may not be need to authenticate the child (or any user), and finding a match or not finding a match does not prevent a person from utilizing the calling party communication device 50.

Based on the match of biometric information, the biometric ID application 54 is configured to provide a picture of the child and/or name (or nickname) to the called party when a call is placed. The called party, who may be a grandparent, can identify that the child, e.g., little Timothy, is calling from the telephone number corresponding to the calling party communication device 50. For example, when the called party communication device 70 is ringing the picture and/or name of Timothy may be displayed on the display 79. It is understood that traditional caller ID information may be displayed too, such as the subscriber's telephone or name.

Also, the calling party communication device 50 may be configured to contain the user profiles of, e.g., residents in a home. In exemplary embodiments, the user database 56 may be configured to contain user profiles of anyone who ever used the calling party communication device 50. For example, the biometric input 52 may obtain voice data of a friend using the calling party communication device 50. If there is no match to the friend's voice data found in the user database 56, the biometric ID application 54 can automatically set up a user profile for the friend based on the friend's voice data (which may be obtained as the friend is talking the calling party communication device 50 or before the friend places a call). The owner or friend can provide any additional information (such as a picture or name) to complete the friend's user profile at a latter time.

Additionally, and/or alternatively, the biometric ID application 54 may prompt the friend to set up a user profile (e.g., request name, picture, relationship, etc.) in response to determining that no user profile exists for the friend. This prompting may occur, e.g., before the friend's call goes through on the calling party communication device 50, before the friend can use the telecommunication network, and/or after the friend has completed a call. Also, in exemplary embodiments, access to the calling party communication device 50 may not be granted if no user profile is created, and/or if no user profile previously exists.

Exemplary embodiments are provided which can provide an identity when multiple people utilize the calling party communication device 50 and the caller party communication device 70. As discussed herein, the revalidation application 58 (the revalidation application 78 and/or the revalidation application 120) can be triggered by a change in biometric information from one person to another person and can determine during an existing call when a new user is, e.g., speaking on the calling party communication device 50 different from the previous user was just speaking on the device 50. The revalidation application 58 in conjunction with the biometric ID application 54 can obtain the voice data of the new user and can determine if a user profile is available in the user database 56 for the new user. If a match is determined, the biometric ID application 54 can provide the user profile corresponding to the new user to the called party communication device 70 during the existing call, so that the called party can recognize that the new user is currently speaking. If there is no match, the biometric ID application 54 can be configured to inform the called party communication device 70 that a new user is speaking without providing a user profile for the new user because the new user profile is not available. For example, the biometric ID application 54 may provide a message that 'a new user is speaking' but the biometric ID application 54 may not have a name or picture associated with the new user since there is no new user profile. If the previous user again begins speaking on the calling party communication device 50, the biometric ID application 54 can then provide the user profile of the previous user to the caller party communication device 70, so that the picture and/or name of the previous user is displayed on the display 79 while the previous user is speaking.

Further, in exemplary embodiments, the biometric ID application 54, the biometric application 74, the revalidation application 58, and/or the revalidation application 78 may work in concert. For example, when the biometric ID application 54 (initially) transmits the user profile (in whole or part) of the previous user to the called party communication device 70, the biometric ID application 74 of the called party communication device 70 can store (temporarily or permanently) the user profile of the previous user in the user database 76. Likewise, when the new user is speaking, the biometric ID application 54 can transmit the message ('a new user is speaking') corresponding to the new user to the called party communication device 70. The biometric ID application 74 can automatically create a (temporary or permanent) new user profile corresponding to the message for the new user, and the biometric ID application 74 can store the new user profile in the user database 76. The previous user profile and the new user profile may both contain respective biometric information. So, if a biometric information change (e.g., the voice data changes because a different person is speaking) is detected by the revalidation application 78 of the called party communication device 70, the revalidation application 78 can cause the biometric ID application 74 to search the user database 76 to determine if the voice data (or any biometric information) matches the new voice data, and the biometric ID application 74 will display the corresponding user profile (which may be the previous user profile or indicate that new user is speaking if there is no match). Accordingly, as the previous user and the new user alternate speaking on the calling party communication device 50, the revalidation application 78 and the biometric ID application 74 can detect the change in voice data and determine the appropriate user profile stored in the user database 76. As such, the biometric ID application 74 can cause the previous user profile and/or the new user profile to be respectively displayed on the display 79 for the called party. In accordance with exemplary embodiments, it is understood that similar processing can take place by utilizing the biometric ID application 54, the revalidation application 57, and the user database 56 of the calling party communication device 50, and/or by using the biometric ID application 110, the revalidation application 120, and the biometric database 115 of the biometric communication system 105.

Although various examples are discussed herein to illustrate how the user profile of the calling party (which may include more than one person) is provided to the called party, it is understood that exemplary embodiments may conversely provide the user profile of the called party to the calling party for display on the display 59. For example, after or before receiving the called party user profile for display on the display 79, the called party may input biometric information (such as retinal scan data, fingerprint data, voice data, etc.) via the biometric input 72. The biometric ID application 74, 110 can receive the biometric information and search for a matching user profile in the user database 76, 115 that identifies the called party. Once the called party user profile is (matched and) retrieved from the user database 76, 115 by the biometric ID application 74, 110, the biometric ID application 74, 110 can transmit the called party user profile to the calling party for display on the display 59. As discussed herein for the change in biometric information for the calling party, changes in the biometric information of the called party can be detected by the revalidation application 78, 120. The revalidation application 78, 120 (along with the biometric ID application 74, 110) can revalidate the biometric information of the called party and can provide a new called party user profile corresponding to the new person, e.g., speaking on the called party communication device 70 instead of the original called party. Accordingly, as different people speak (which causes the biometric information to change) on the called party communication device 70, the revalidation application 74, 110 can detect the change and provide the corresponding called party user profile to the calling party communication device 50 for display on the display 59 in accordance with exemplary embodiments.

Figure 2:
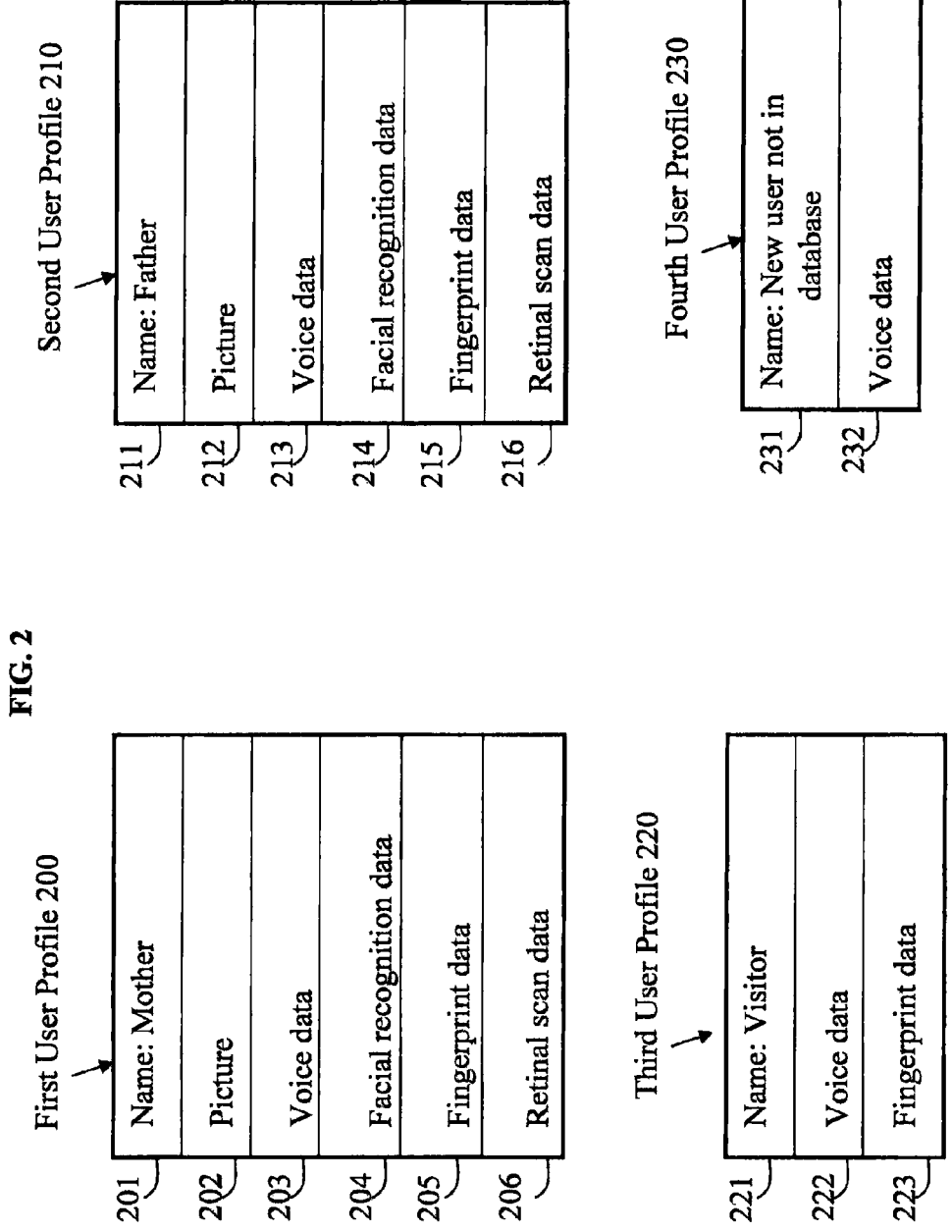
FIG. 2 illustrates an example of various user profiles in accordance with exemplary embodiments.

FIG. 2 illustrates an example of various user profiles in accordance with exemplary embodiments. The user profiles may be created at various times and may contain various information, including images, audio, video, and data. For example, a user profile may previously exist and can be retrieved when need. Another user profile may be created right before a call is placed. Yet another user profile may be created in the midst of a call.

FIG. 2 illustrates a first user profile 200, a second user profile 210, a third user profile, 220, and a fourth user profile 230, and each user profile may be stored in the database 56, 76, 115 in accordance with exemplary embodiments.

As one example, the first user profile 200 may be a user profile for a mother and may be stored in the user database 56 of the calling party communication device 50. When the mother places a call utilizing the calling party communication device 50, and when the biometric information of the mother is authenticated by the biometric ID application 54, the biometric ID application 54 provides the first user profile 200 (in whole or part) via the network 120 to the called party communication device 70 while the called party communication device 70 is ringing. The called party may view a name 201 of the mother and/or a picture 202 of the mother on the display 79. In some exemplary embodiments, the first user profile 200 may also be stored (in whole or part) in the user database 76. As such, the revalidation application 78 can detect a change in biometric information and can recognize biometric information (203, 204, 205, 206) of the mother in the first user profile 200.

During the call with the called party, the father may begin speaking on the calling party communication device 50. If the father (purposely or accidentally) places, e.g., his finger on the biometric input 52, the biometric ID application 54 can identify the second user profile 210 for the father in the user database 56 based on fingerprint data 215, and the biometric ID application 54 can provide the second user profile 210 (in whole or part) to the called party communication device 70. Also, the biometric ID application 54 can identify the father by voice data 213, facial recognition data 214, the fingerprint data 215, and/or retinal scan data 216. A name 211 of the father and/or a picture 212 of the father may be displayed on the display 79. After receiving the second user profile 210, the biometric ID application 74 of the called party communication device 70 can store the second user profile 210 for the father in the user database 76.

During the (same) call, a friend may utilize the calling party communication device 50. Since this is not the first time that the friend has utilized the calling party communication device 50, the user database 56 contains the third user profile 220 which has listed a name 221 of the friend as visitor because the friend has not input his actual name. Also, the friend may have touched the biometric input 52 (purposely or accidentally), such that the biometric input 52 captured fingerprint data 223 of the friend. Since the friend spoke on the calling party communication device 50 in the past, the biometric input 52 captured voice data 222 of the friend. With or without the friend being aware, the third user profile 220 may be created for the friend by the friend's previous use of the calling party communication device 50. As such, if the biometric ID application 54 recognizes any biometric information corresponding to the friend in subsequent uses of the calling party communication device 50 by the friend, the biometric ID application 54 can retrieve the third user profile 220 corresponding to the friend (with or without the friend's knowledge). Further, regarding the example of the existing call, the biometric ID application 54 recognizes the biometric information (in this case the voice data 222 or fingerprint data 223) of the friend and retrieves the corresponding third user profile 220 from the user database 56. The biometric ID application 54 provides the third user profile 220 (in whole or part) to the called party communication device 70, where the name 221 visitor can be displayed on the display 79, and wherein the third user profile 220 can be stored in the user database 76.

Also, during the existing call with the called party, a new person not in the user database 56 may utilize the calling party communication device 70. As the new user speaks the biometric ID application 54 can create the (new) fourth user profile 230 for the new user and store voice data 232 for the new user. The fourth user profile 230 is created because the biometric ID application 54 cannot find matching biometric information (the voice data 232 in this case) in the user database 56. The biometric ID application 54 may automatically list a name 231, such as "new user not in database", for the new user in the fourth user profile 230. Currently or at a later time, the new user or the owner may provide an actual name 231 for the new user. The biometric ID application 54 provides the fourth user profile 230 (in whole or part) to the called party communication device 70, where the biometric ID application 74 displays the name 231 new user not in database on the display 79 for the called party.

In accordance with exemplary embodiments, at anytime during the existing call when, e.g., a different person from the previous person starts speaking, and/or when the fingerprint data changes from one person to another person, the revalidation application 58 (or the revalidation application 78, 110) detects the biometric information change. The revalidation application 58 in conjunction with the biometric ID application 54 (or the revalidation application 78, 120 in conjunction with the biometric ID application 74, 110) retrieves (or creates) the appropriate user profile from the user database 76 of the called party communication device 70. For example, the first user profile 200 of the mother may be displayed on the display 79 as the mother is talking to the called party. When the friend starts speaking (which is different voice data from the mother), the revalidation application 78 (with the biometric ID application 74) can detect the change in biometric information (e.g., the change in voice data), and the revalidation application 78 causes the third user profile 220 to be (retrieved from the user database 76 and) displayed on the display 79. For example, as the friend is speaking, the name 221 visitor (there is no picture stored for the visitor) may be displayed for the called party instead of the name 201 mother and picture 202 of the mother Likewise, as others speak and/or touch the biometric input 52 with their fingers, the revalidation application 78 can detect the various biometric information changes and provide the appropriate user profile 200, 210, 220, 230 stored in the user database 76.

Also, it is understood that there may be more identifying information in the user profiles 200, 210, 220, and 230 than illustrated in FIG. 2. The user profiles 200, 210, 220, and 230 are provided for illustrative purposes only and not meant to be limiting.

Figure 3:
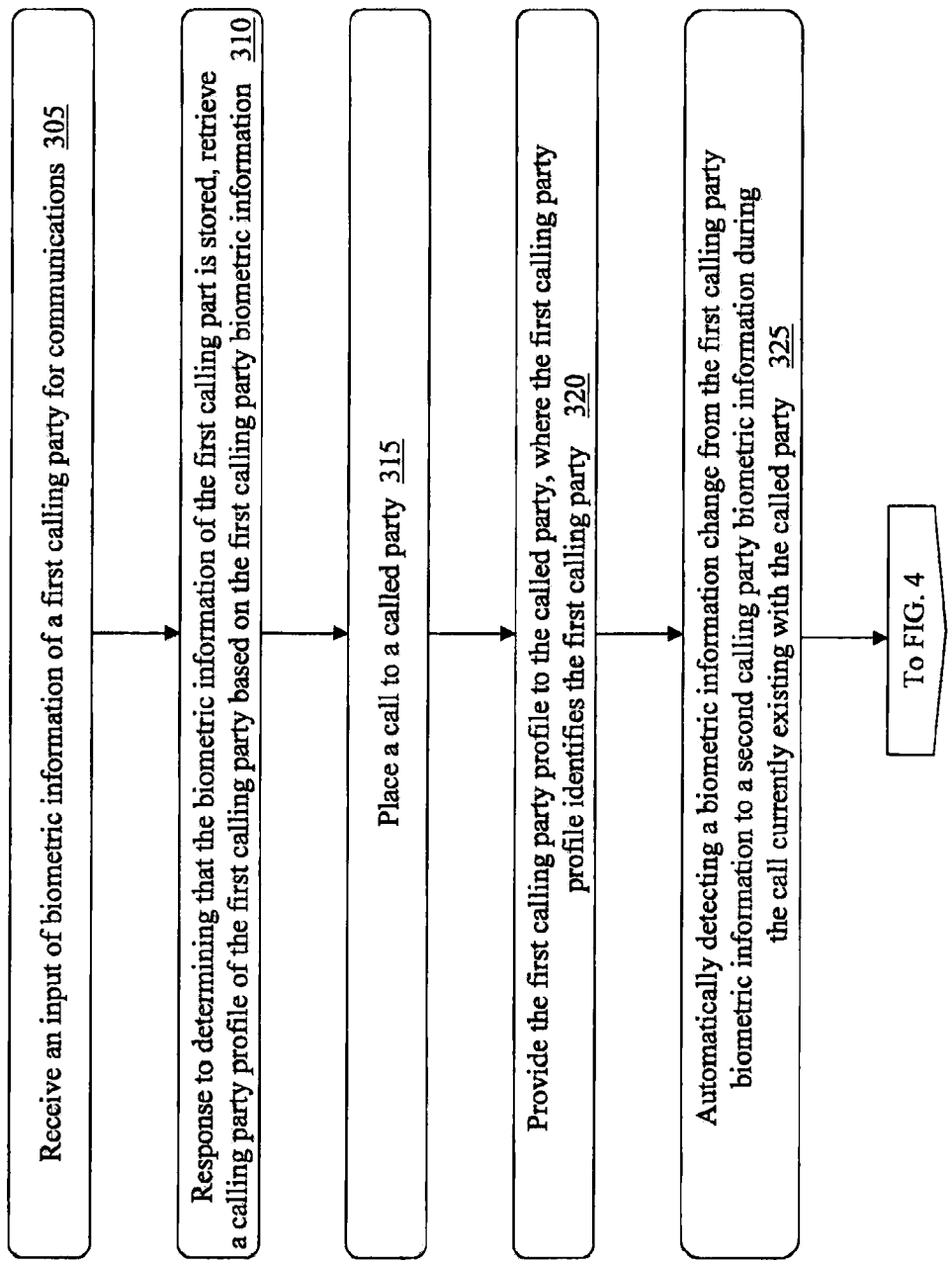
FIGS. 3 and 4 illustrate a method for identifying a calling party to a called party utilizing biometric information in accordance with exemplary embodiments.
Figure 4:
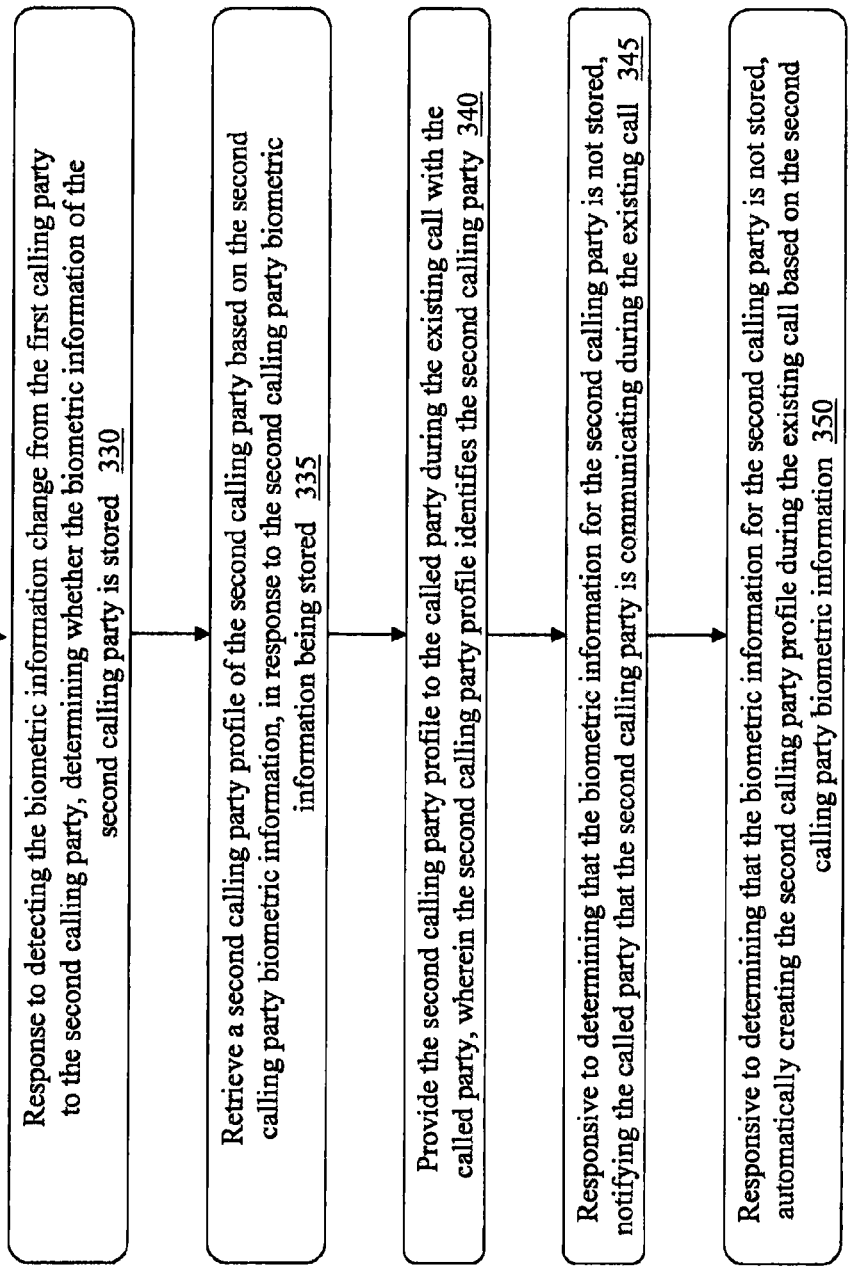

FIGS. 3 and 4 illustrate a method for identifying a calling party to a called party utilizing biometric information in accordance with exemplary embodiments.

An input of biometric information of a first calling party is received for communications at 305. The biometric information may be input using the biometric input 52, 72 via the respective biometric ID application 54, 74, 110.

In response to determining that the biometric information of the first calling party is stored, a calling party profile is retrieved for the first calling party based on the first calling party biometric information at 310. The biometric ID application 54, 74, 110 may determine that the first calling party biometric information is stored in the respective user database 56, 76, 115 and may retrieve the calling party profile for the first calling party.

A call is placed to a called party at 315. The calling party communication device 50 operatively places a call to the called party communication device 70 via the network 120. The calling party communication device 50 and the called party communication device 70 may include the various features of, e.g., iPhone® by Apple Inc. or any other telephone for placing a call as understood in the art.

The first calling party profile is provided to the called party, where the first calling party profile identifies the first calling party at 320. The biometric ID application 54, 74, 110 may respectively provide the first calling party profile to the called party communication device 70 to be displayed on the display 79. For example, the first calling party profile may be displayed after the first or second ring.

A biometric information change from the first calling party biometric information to a second calling party biometric information is automatically detected during the call currently existing with the called party at 325. The biometric ID application 54, 74, 110 in conjunction with the respective revalidation application 58, 78, 120 can detect the change in biometric information during the existing call with the called party.

In response to detecting the biometric information change from the first calling party to the second calling party, it is determined whether the biometric information of the second calling party is stored at 330. The biometric ID application 54, 74, 110 can respectively determine if the biometric information of the second calling party is stored in the user database 56, 76, 115.

A second calling party profile of the second calling party is retrieved based on the second calling party biometric information, in response to the second calling party biometric information being stored at 335. The biometric ID application 54, 74, 110 can respectively locate and obtain the second calling party stored in the user database 56, 76, 115.

The second calling party profile is provided to the called party during the existing call with the called party, where the second calling party profile identifies the second calling party at 340. For example, the biometric ID application 54, 74, 110 can provide the second calling party profile to the called party communication device so that the appropriate information (e.g., picture, name, telephone number, nickname, age, etc.) of the second calling party profile is displayed on the display 79.

In response to determining that the biometric information for the second calling party is not stored, the called party is notified that the second calling party is communicating during the existing call at 345. The biometric ID application 54, 74, 110 can provide a message for display on the display 79 to notify the called party that a different person is currently speaking or that a different person is communicating on the telephone. Also, an alert can be provided (such as an audible sound like a beep) to notify the called party that a new person is communicating during the call, and each time the new person (or any other new person) communicates, the called party can be alerted (e.g., audibly, by message, by flashing lights, etc.).

In response to determining that the biometric information for the second calling party is not stored, the second calling party profile is automatically created during the existing call based on the second calling party biometric information at 350. For example, the biometric ID application 54, 74, 110 can (automatically) create a new user profile for the second calling party to be stored respectively in the user database 56, 76, 115, and each time the new person (such as the second calling party) is detected (speaking during the call), the new user profile is displayed on the display 79 for the called party.

Further, notifying the called party that the second calling party is communicating during the existing call includes notifying the called party that the second calling party is currently speaking during the existing call. Also, automatically detecting the biometric information change is triggered during the existing call with the called party. The triggering of automatically detecting the biometric information change may be caused by a change in biometric information comprising facial recognition data, voice data, fingerprint data, and retinal data.

Exemplary embodiments may require the first calling party to re-input biometric information at predetermined times throughout the existing call with the called party. The re-input biometric information of the first calling party is validated by determining that the first calling party user profile corresponds to the re-input biometric information is stored.

The existing call may be continually monitored to detect changes in biometric information, and in response to detecting changes in biometric information, a corresponding user profile is provided to the called party.

Also, the existing call is monitored for silence for a predetermined time, and in response to detecting silence for the predetermined time, there is a check for a change in biometric information.

In response to determining that the biometric information for the second calling party is not stored, the called party is notified that the second calling party is a new user without identity data stored, and anytime the second calling party biometric information is detected during the existing call with the called party, the second calling party is identified as the new user to the called party.

Further, an input of biometric information of the called party is received, and in response to determining that the biometric information of the called party is stored, a called party profile of the called party is retrieved based on the called party biometric information. The called party profile is provided to the first calling party, such that the called party profile identifies the called party.

The biometric information caller ID services discussed herein can be applied with any type of communication system that uses caller ID. For example, the biometric information caller ID services can be implemented in wireless communication systems with cellular telephones and can be implemented in voice over Internet protocol (VoIP) systems.

Also, the biometric information caller ID services can be implemented in an IP multimedia system (IMS) in accordance with exemplary embodiments. The IP multimedia system is an architectural framework for implementing real time services such as voice call processing over the Internet protocol. One skilled in the art understands the various elements in IMS. It is understood that IMS network may include a P-CSCF (proxy call session control function, a Home Subscriber Server (HSS), and a S-CSCF (serving call session control function). The IMS network may utilize various protocols, such as session initiation protocol (SIP) proxy, dynamic host configuration protocol (DHCP), and packet data protocol (PDP).

Although it is understood that exemplary embodiments are applicable to IP to IP calls, VoIP and Wi-Max based communication, or any other means of voice communications, exemplary embodiments also can confirm the sender identity of electronic text/mail or multimedia messages on the communication network to the recipient. For example, biometric information may be collected from the sender using the biometric input 52, and the biometric ID application 54, 110 can use the sender's biometric information to retrieve the sender's user profile in the database 56, 115. The sender's user profile can be (automatically) transmitted to the recipient on the called party communication device 70 along with the electronic mail and can be displayed on the display 79. Also, in exemplary embodiments the user profile may not be automatically transmitted to the recipient, but the recipient can receive a notification (such as a message, an audible sound, a pop-up, etc.) to alert the recipient that the sender's user profile is available to display on the display 79. The recipient may have an option to choose to receive the sender's user profile, in whole or part, for display on the display 79.

For the sake of clarity, general elements of the calling party communication device 50, the called party communication device 70, and the biometric communication system 105 are not shown in the architecture 100 of FIG. 1. For example, it is understood that the calling party communication device 50, the called party communication device 70, and the biometric communication system 105 include memory, an operating system, and processors, and other software, hardware, and firmware (such as memory 520, an operating system 550, processors 510, and applications 560 shown in FIG. 5 below). The calling party communication device 50, the called party communication device 70, and the biometric communication system 105 also include input/output devices (such as input/output devices 570 shown in FIG. 5 below) for transmitting and receiving signals and for inputting and outputting information (such as a keypad, display, cables, transceivers, USB ports, headset ports, microphones, cameras, etc.). Also, various elements illustrated in the calling party communication device 50, the called party communication device 70, and the biometric communication system 105 may be locally or remotely situated.

Figure 5:
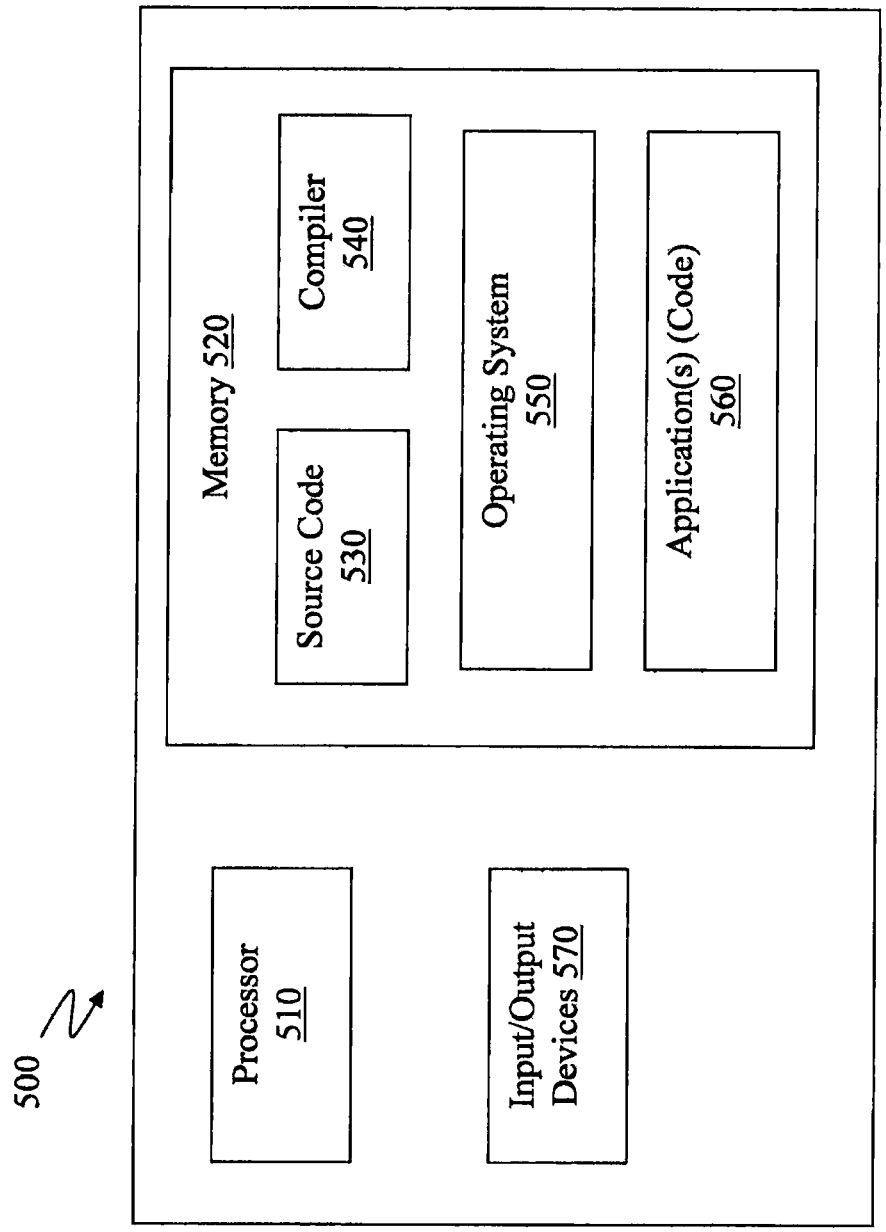
FIG. 5 illustrates an example of a computer having elements that may be used in implementing exemplary embodiments.

Now turning to FIG. 5, FIG. 5 illustrates an example of a computer 500 having elements that may be used in implementing exemplary embodiments. The computer 500 includes, but is not limited to, PCs, workstations, laptops, PDAs, palm devices, servers, mobile devices, communication devices, cell phones, and the like. The computer 500 may include a processor 510, memory 520, and one or more input and/or output (I/O) 570 devices (or peripherals) that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 510 is a hardware device for executing software that can be stored in the memory 520. The processor 510 can be virtually any custom made or commercially available processor, a central processing unit (CPU), a data signal processor (DSP), or an auxiliary processor among several processors associated with the computer 500, and the processor 510 may be a semiconductor based microprocessor (in the form of a microchip) or a macroprocessor.

The memory 520 can include any one or combination of volatile memory elements (e.g., random access memory (RAM, such as dynamic random access memory (DRAM), static random access memory (SRAM), etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 520 may incorporate electronic, magnetic, optical, and/or other types of storage media. Note that the memory 520 can have a distributed architecture, where various components are situated remote from one another, but can be accessed by the processor 510.

The software in the memory 520 may include one or more separate programs, each of which comprises an ordered listing of executable instructions for implementing logical functions. In the example illustrated in FIG. 5, the software in the memory 520 includes a suitable operating system (O/S) 550, compiler 540, source code 530, and an application 560 of the exemplary embodiments.

The operating system 550 controls the execution of other computer programs, and provides scheduling, input-output control, file and data management, memory management, and communication control and related services. It is contemplated by the inventors that the application 560 for implementing exemplary embodiments is applicable on all other commercially available operating systems.

The application 560 may be a source program, executable program (object code), script, or any other entity comprising a set of instructions to be performed. When a source program is to be executed, then the program is usually translated via a compiler (such as the compiler 540), assembler, interpreter, or the like, which may or may not be included within the memory 520, so as to operate properly in connection with the O/S 550. Furthermore, the application 560 can be written as (a) an object oriented programming language, which has classes of data and methods, or (b) a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 570 may include input devices such as, for example but not limited to, a mouse, keyboard, scanner, microphone, biometric input device(s), etc. Furthermore, the I/O devices 570 may also include output devices, for example but not limited to, a printer, display, etc. Also, the I/O devices 570 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 570 include may include modems, gateways, receivers, transmitters, transceivers, etc. for communicating over a communications network.

When the computer 500 is in operation, the processor 510 is configured to execute software stored within the memory 520, to communicate data to and from the memory 520, and to generally control operations of the computer 500 pursuant to the software. The application 560 and the O/S 550 are read, in whole or in part, by the processor 510, perhaps buffered within the processor 510, and then executed.

When the application 560 is implemented in software, it should be noted that the application 560 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 560 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, computer programs tangibly embodied on a computer-readable medium can be stored, communicated, propagated, or transported for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 560 is implemented in hardware, the application 560 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer. When the computer program code is loaded into an executed by a computer, the computer becomes an apparatus for practicing the exemplary embodiments. When implemented on a general-purpose microprocessor, the computer program code segments configure the microprocessor to create specific logic circuits. It is understood that computer program code can be transmitted over some transmission medium, loaded into and/or executed by a computer, or transmitted over some transmission medium, such as over electrical wiring or cabling, through fiber optics, or via electromagnetic radiation.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for identifying a calling party to a called party utilizing biometric information, the method comprising:

receiving an input of a first calling party biometric information of a first calling party;

retrieving a first calling party profile of the first calling party based on the first calling party biometric information;

placing a call to the called party;

providing the first calling party profile to the called party, wherein the first calling party profile identifies the first calling party;

detecting a biometric information change from the first calling party biometric information to a second calling party biometric information of a second calling party during the call currently existing with the called party;

in response to detecting the biometric information change from the first calling party to the second calling party, determining whether the second calling party biometric information of the second calling party is stored;

retrieving a second calling party profile of the second calling party based on the second calling party biometric information, in response to the second calling party biometric information being stored;

providing the second calling party profile to the called party during the call currently existing with the called party, in response to the second calling party biometric information being stored, wherein the second calling party profile identifies the second calling party;

in response to determining that the second calling party biometric information for the second calling party is not stored, notifying the called party that the second calling party is communicating during the call currently existing;

in response to determining that the second calling party biometric information for the second calling party is not stored, automatically creating the second calling party profile during the call currently existing based on the second calling party biometric information; and in response to determining that the second calling party biometric information for the second calling party is not stored, notifying the called party that the second calling party is a new user without identity data stored.

2. The method of claim 1,
wherein notifying the called party that the second calling party is communicating during the call currently existing comprises notifying the called party that the second calling party is currently speaking during the call currently existing.

3. The method of claim 1, wherein automatically detecting the biometric information change is caused by a trigger during the call currently existing with the called party.

4. The method of claim 3, wherein the trigger comprises automatically detecting the biometric information change is caused by a change in biometric information comprising a selection from:
   facial recognition data;
   voice data;
   fingerprint data; and
   retinal data.

5. The method of claim 1, further comprising requiring the first calling party to re-input biometric information at predetermined times throughout the call currently existing with the called party.

6. The method of claim 5, wherein the re-input biometric information of the first calling party is validated by determining that the first calling party profile corresponding to the re-input biometric information is stored.

7. The method of claim 1, further comprising:
   continually monitoring the call currently existing to detect biometric information changes; and
   in response to detecting the biometric information change, providing a corresponding user profile to the called party.

8. The method of claim 1, further comprising:
   monitoring the call currently existing for silence for a predetermined time; and
   in response to detecting silence for the predetermined time, checking for the biometric information change.

9. The method of claim 1, wherein, anytime the second calling party biometric information is detected during the call currently existing with the called party, the second calling party is identified as the new user to the called party.

10. The method of claim 1, further comprising:
    receiving input of a called party biometric information of the called party;
    in response to determining that the called party biometric information of the called party is stored, retrieving a called party profile of the called party based on the called party biometric information; and
    providing the called party profile to the first calling party, wherein the called party profile identifies the called party.

11. An apparatus for identifying a calling party to a called party utilizing biometric information, the apparatus comprising:
    memory comprising computer-executable instructions for providing identification information; and
    a processor executing the computer-executable instructions, the computer-executable instructions, when executed by the processor, cause the processor to perform operations comprising:
    receiving an input of a first calling party biometric information of a first calling party for communications;
    retrieving a first calling party profile of the first calling party based on the first calling party biometric information;
    placing a call to the called party;
    providing the first calling party profile to the called party, wherein the first calling party profile identifies the first calling party;
    automatically detecting a biometric information change from the first calling party biometric information to a second calling party biometric information of a second calling party during the call currently existing with the called party;
    in response to detecting the biometric information change from the first calling party to the second calling party, determining whether the second calling party biometric information of the second calling party is stored;
    retrieving a second calling party profile of the second calling party based on the second calling party biometric information, in response to the second calling party biometric information being stored;
    providing the second calling party profile to the called party during the call currently existing with the called party, in response to the second calling party biometric information being stored, wherein the second calling party profile identifies the second calling party;
    in response to determining that the second calling party biometric information for the second calling party is not stored, notifying the called party that the second calling party is communicating during the call currently existing;
    in response to determining that the second calling party biometric information for the second calling party is not stored, automatically creating the second calling party profile during the call currently existing based on the second calling party biometric information; and
    in response to determining that the second calling party biometric information for the second calling party is not stored, notifying the called party that the second calling party is a new user without identity data stored.

12. The apparatus of claim 11, wherein notifying the called party that the second calling party is communicating during the call currently existing comprises notifying the called party that the second calling party is currently speaking during the call currently existing.

13. The apparatus of claim 11, wherein automatically detecting the biometric information change is triggered during the call currently existing with the called party; and
    wherein, anytime the second calling party biometric information is detected during the call currently existing with the called party, the second calling party is identified as the new user to the called party.

14. The apparatus of claim 13, wherein the triggering of automatically detecting the biometric information change is caused by a change in biometric information comprising a selection from:

facial recognition data;
voice data;
fingerprint data; and
retinal data.

15. The apparatus of claim 11, further comprising requiring the first calling party to re-input biometric information at predetermined times throughout the call currently existing with the called party.

16. The apparatus of claim 11, further comprising:
continually monitoring the call currently existing to detect biometric information changes; and
in response to detecting the biometric information change, providing a corresponding user profile to the called party.

17. A computer program product, tangibly embodied on a computer readable medium, for providing identification information to a called party, the computer program product including instructions that, when executed by a computer, cause the computer to perform operations comprising:
receiving an input of a first calling party biometric information of a first calling party for communications;
retrieving a first calling party profile of the first calling party based on the first calling party biometric information;
placing a call to the called party;
providing the first calling party profile to the called party, wherein the first calling party profile identifies the first calling party;
automatically detecting a biometric information change from the first calling party biometric information to a second calling party biometric information of a second calling party during the call currently existing with the called party;
in response to detecting the biometric information change from the first calling party to the second calling party, determining whether the second calling party biometric information of the second calling party is stored;
retrieving a second calling party profile of the second calling party based on the second calling party biometric information, in response to the second calling party biometric information being stored;
providing the second calling party profile to the called party during the call currently existing with the called party, in response to the second calling party biometric information being stored, wherein the second calling party profile identifies the second calling party;
in response to determining that the second calling party biometric information for the second calling party is not stored, notifying the called party that the second calling party is communicating during the call currently existing;
in response to determining that the second calling party biometric information for the second calling party is not stored, automatically creating the second calling party profile during the call currently existing based on the second calling party biometric information; and
in response to determining that the second calling party biometric information for the second calling party is not stored, notifying the called party that the second calling party is a new user without identity data stored.

18. The computer program product of claim 17, wherein notifying the called party that the second calling party is communicating during the call currently existing comprises notifying the called party that the second calling party is currently speaking during the call currently existing.

19. The computer program product of claim 17, wherein automatically detecting the biometric information change is triggered during the call currently existing with the called party.

20. The computer program product of claim 19, wherein the triggering of automatically detecting the biometric information change is caused by a change in biometric information comprising a selection from:
facial recognition data;
voice data;
fingerprint data; and
retinal data.

* * * * *